United States Patent [19]

Hirose et al.

[11] Patent Number: 5,022,081
[45] Date of Patent: Jun. 4, 1991

[54] INFORMATION RECOGNITION SYSTEM

[75] Inventors: Hitoshi Hirose, Osaka; Fumio Togawa, Nara, both of Japan

[73] Assignee: Sharp Kabushiki Kaisha, Osaka, Japan

[21] Appl. No.: 593,557

[22] Filed: Oct. 9, 1990

Related U.S. Application Data

[63] Continuation of Ser. No. 252,793, Sep. 30, 1988, abandoned.

[30] Foreign Application Priority Data

Oct. 1, 1987 [JP] Japan .................................. 62-248727
Oct. 7, 1987 [JP] Japan .................................. 62-255253

[51] Int. Cl.$^5$ ................................................ G10L 5/00
[52] U.S. Cl. ......................................... 381/43; 381/48; 364/513.5; 364/419; 364/518
[58] Field of Search ................. 381/43, 48; 364/513.5, 364/419, 518

[56] References Cited

U.S. PATENT DOCUMENTS 4,661,915  4/1987  Ott ......................................... 381/44
4,829,576  5/1989  Porter .................................. 381/44

Primary Examiner—Emanuel S. Kemeny

[57] ABSTRACT

An information recognition system includes a recognition unit for recognizing inputted information as groups of candidate characters, a memory for storing the groups of candidate characters, a display-integrated tablet for displaying top characters in the groups of candidate characters, also a coordinate input device for indicating one of the displayed characters, and a character correcting device which replaces the top character indicated by the coordinate indicating device with another character in the group to which the indicated top character belongs are provided.

13 Claims, 5 Drawing Sheets

| CANDIDATE ORDER | TOP | t | o | d | a | g |
|---|---|---|---|---|---|---|
| | SECOND | f | a | a | d | j |
| | THIRD | e | q | q | o | y |
| | FOURTH | p | d | | | v |
| | FIFTH | | c | | | |

INFORMATION RECOGNITION SYSTEM

This application is a continuation, of application Ser. No. 07/252,793 filed on 9-30-88, now abandoned.

BACKGROUND OF THE INVENTION

1. Field of the invention:

This invention relates to an information recognition system using on-line character recognition, OCR (Optical Character Recognition), voice recognition or the like.

2. Description of the related art:

An example of a conventional information recognition system is illustrated in FIG. 8. This information recognition system includes an input unit 21, a recognition unit 22, a display 23, and a keyboard 24. The input unit 21 has a tablet or a digitizer 25 which functions as an on-line character input device, an optical scanner 26 for conducting OCR, and a microphone 27 which functions as a voice input device. The character or voice information inputted into the input unit 21 is transmitted to the recognition unit 22 and converted into feature patterns. The obtained feature patterns are collated with the standard patterns stored in a standard dictionary or the like and recognized as characters. The recognized characters are displayed on the display 23.

In the system of FIG. 8, the correction of an erroneously recognized character (hereinafter, referred as an "error character") is performed as follows: The operator operates cursor keys of the keyboard 24 for moving a cursor 28 (FIG. 9) on the display 23 to the position of an error character (the character "q" in FIG. 9). Thereafter, information to be recognized is inputted again through the input unit 21, or the correct character is inputted through the keyboard 24. Alternatively, the correct character is selected by operating a next candidate key provided in the tablet 25 or keyboard 24.

When the correction of an error character is performed in such a conventional information recognition system as described above, the cursor 28 must be moved to the position of the error character in order to be corrected. When the cursor 28 is at a long distance from the error character to be corrected (e.g., the letter "q" shown in FIG. 9), cursor keys of the keyboard 24 must be operated many times, i.e., the vertical-direction and the horizontal-direction cursor keys must be operated n times and m times respectively, which results in a cumbersome correcting operation and reduced operability of the system.

SUMMARY OF THE INVENTION

The information recognition system for the present invention, which overcomes the above-discussed and numerous other disadvantages and deficiencies includes input means for inputting information; recognition means for recognizing inputted information as one or more groups of candidate characters; memory means for storing said groups of candidate characters, the candidate characters in each group being arranged in order; display means for displaying top characters in said groups of candidate characters, said display means being a display-integrated tablet having coordinate input means by which a character displayed on said display means is indicated; and character correcting means which replaces the top character indicated by said coordinate indicating means with another character in the group to which said indicated top character belongs.

In a preferred embodiment, the display-integrated tablet also functions as said input means.

In a preferred embodiment, the input means is an optical character reader.

In a preferred embodiment, the input means is a microphone.

The information recognition system includes input means for inputting information; recognition means for recognizing inputted information as one or more groups of candidate characters; memory means for storing said groups of candidate characters, the candidate characters in each group being arranged in order; display means for displaying top characters in said groups of candidate characters, said display means being display-integrated tablet having a coordinate input means by which a character displayed on said display means is indicated; means for displaying at the vicinity of said indicated top character other candidate characters in said group to which the top character indicated by said coordinate indicating means belongs; and character correcting means which replaces said displayed top character with one of said other characters which is indicated by said coordinate indicating means.

In a preferred embodiment, the system further includes means for displaying on said display means one or more icons for moving said coordinate indicating means.

In a preferred embodiment, the system further includes means for sequentially displaying characters in a predetermined order on display means, In a preferred embodiment, the display-integrated tablet also functions as said input means.

In a preferred embodiment, the input means is an optical scanner.

In a preferred embodiment, the input means is a microphone.

Thus, the present invention described herein (1) provides an information recognition system in which the number of operations for correcting an error character can be effectively reduced; and (2) provides an information recognition system which has efficient operability.

BRIEF DESCRIPTION OF THE DRAWINGS

The present invention may be better understood and its numerous objects and advantages will become apparent to those skilled in the art by reference to the accompanying drawings as follows.

DESCRIPTION OF THE PREFERRED EMBODIMENTS

Figure 1A:
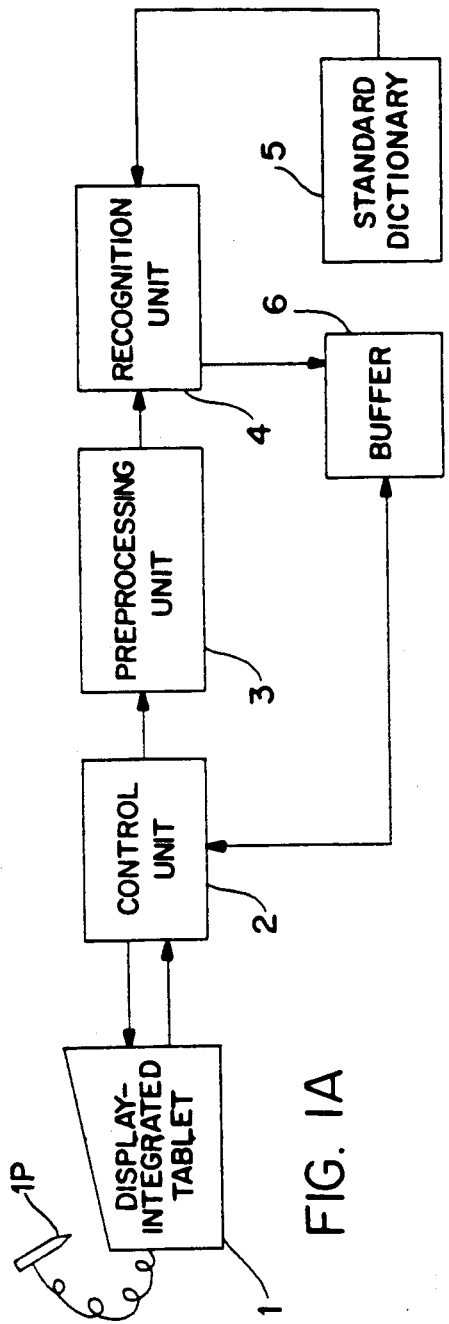
FIG. 1A is a block diagram of an on-line information recognition according to an embodiment of the present invention.

An on-line character recognition system according to an embodiment of the present invention is illustrated in FIG. 1A. The system of FIG. 1A includes a tablet 1, a control unit 2, a preprocessing unit 3, a recognition unit 4, a standard dictionary 5, and a buffer 6.

Figures 4, 5:
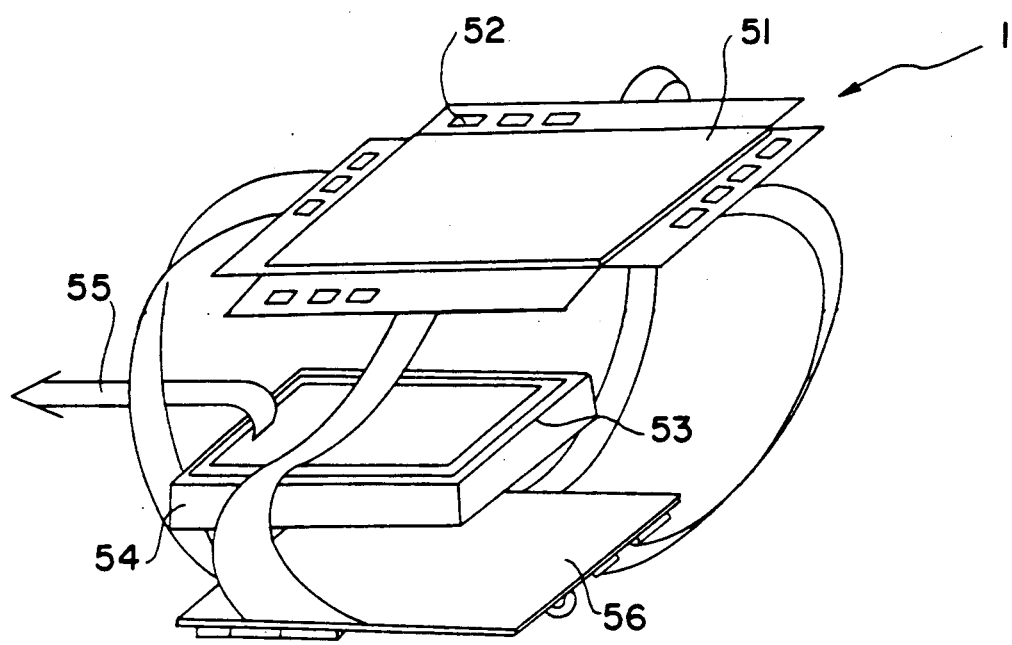
FIG. 4 is a table of groups of candidate characters for the example of FIG. 2.
FIG. 5 is a exploded perspective view illustrating a display-integrated tablet for the system of FIG. 1A.

The tablet 1 is a display-integrated type, and has a pen 1P which functions as a coordinate input device. As illustrated in FIG. 5, the tablet 1 includes an EL display panel 51, ICs 52 for driving the panel 51, a digitizer 53 of an electromagnetic induction type, a magnetic shield 54, a connecting line 55 for the digitizer 53, and a control circuit board 56 for the EL display panel 51.

The control unit 2 controls each unit of the system and also functions as a character correcting unit. The preprocessing unit 3 converts character information inputted by the operator using the pen 1P, into feature patterns. In the recognition unit 4, the obtained feature patterns are collated with the standard patterns stored in the standard dictionary 5, and are recognized as groups of characters (groups of candidate characters). The buffer 6 stores the groups of candidate characters in order of probability (in other words, the candidate characters which seem to be the most accurate character expressions of the inputted information are at the top in each group). The control unit 2 reads out the characters which are at the top of the candidate characters in each group, and these characters to the tablet 1. The characters are displayed in block letters (numbers, or symbols) on the EL display panel 51 of the tablet 1, as substitutes for the characters which have been handwritten by the operator.

When one of the characters displayed on the tablet 1 is not correct, the operator indicates the error character on the tablet 1 with the pen 1P for moving the cursor to the position of the error character. The control unit 2 reads out the second candidate character in the group having the error character so that the second candidate character is displayed in place of the error character. The control unit 2 rearranges the order of the candidate characters in the group so that the next candidate character becomes the first character in the group and the error character becomes the character in the group.

Figure 2:
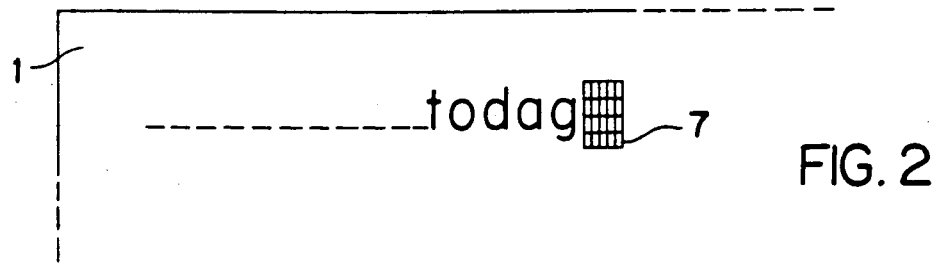
FIG. 2 illustrates an example of a candidate character string displayed on the system of FIG. 1A.
Figure 3A:
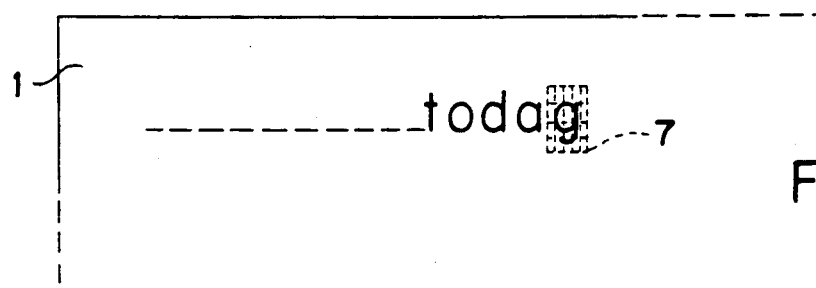
FIGS. 3(a) to 3(c) illustrate correcting an error character in the candidate character string of FIG. 2.
Figure 3B:
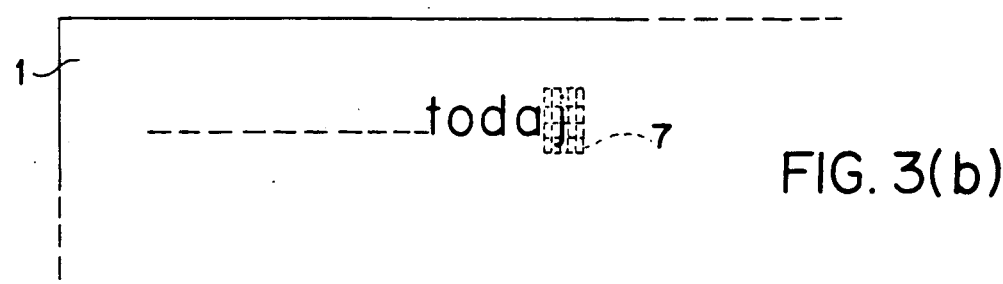
Figure 3C:
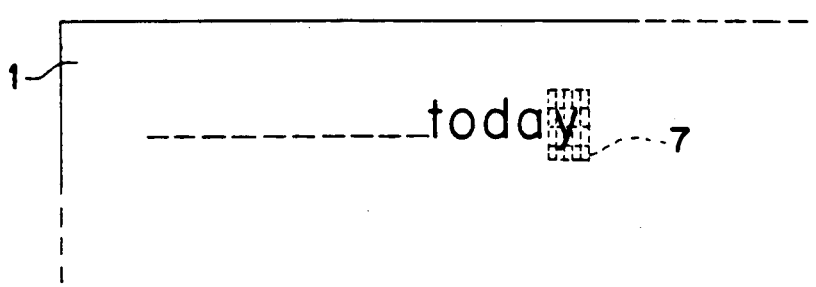

The operation of the on-line character recognition system will be described more specifically. When the operator writes the characters "today" on the tablet 1 with the pen 1P, for example, the recognition unit 4 recognizes the inputted character information as groups of candidate characters. As illustrated in FIG. 4, the candidate characters of each group are stored into the buffer 6 in order of probability. The top characters of each groups are displayed on the tablet 1 as a character string "todag" (FIG. 2). The operator indicates the error character "g" with the pen 1P. Then, the cursor 7 moves to the position of the error character "g" (FIG. 3(a)), and the control unit 2 reads out the character "j" from the buffer 6 which is the second candidate character in the group (the fifth column in FIG. 4) corresponding to the correct character "y" of the inputted character information "today". The second candidate character "j" is sent to the tablet 1 and displayed in place of the error character (the character "g" (FIG. 3(b)). In this example, the second candidate character "j" also is incorrect. Hence, the operator further operates the pen 1P for indicating that the character "j" displayed on the tablet 1 is an error character. The third candidate character "y" is displayed on the tablet 1 in place of the second candidate character "j" (FIG. 3(c)). After confirming that all characters in the displayed character string coincide with the inputted character information "today", the operator conducts the input operation of the succeeding character information. The string of the correct characters are sent to a memory (not shown) to be stored as character information.

As described above, the information recognition system of this example can eliminate the necessities of operating a cursor key many times and inputting a correct character through a keyboard. Thereby, the rapid correction of error characters results and an efficient operability of the system is improved.

Figure 6A:
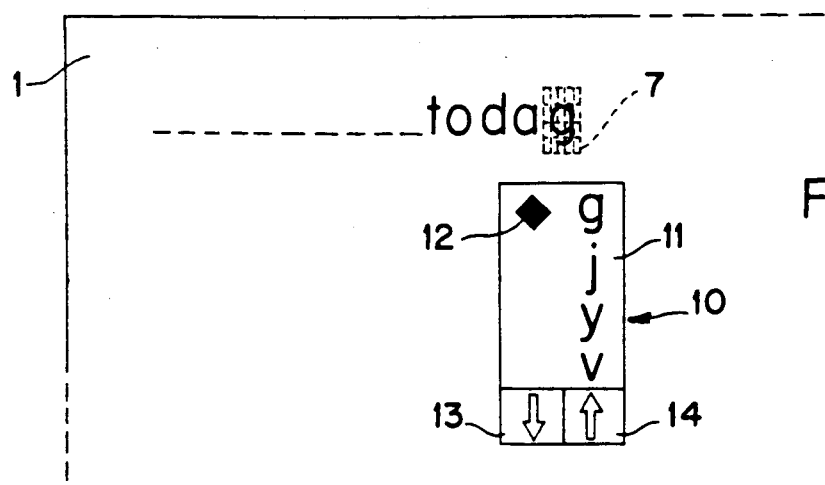
FIGS. 6(a) and 6(b) illustrate another way of correcting the error character in the candidate character string of FIG. 2.
Figure 7:
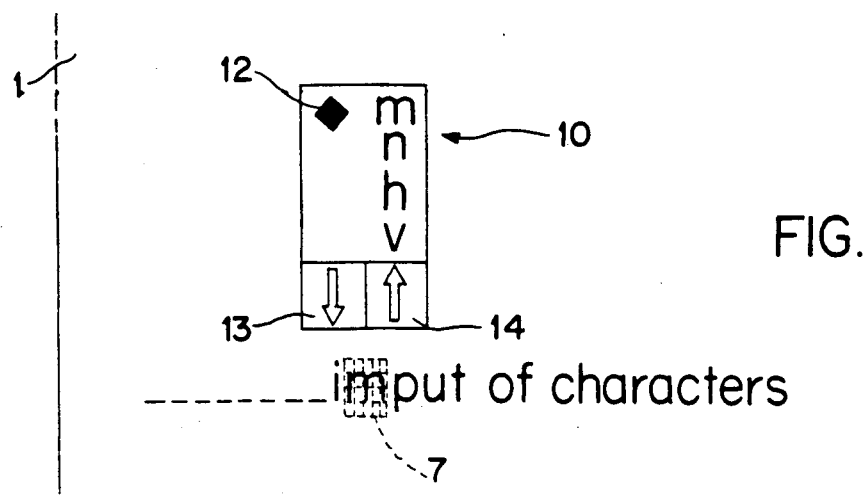
FIG. 7 illustrates a further way of correcting the error character in the candidate character string of FIG. 2.
Figure 8:
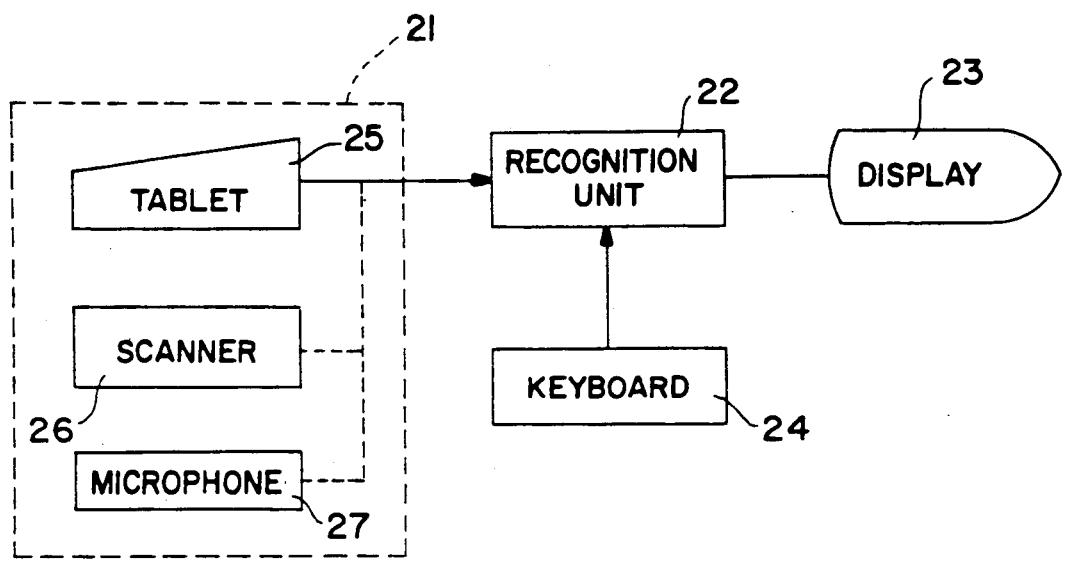
FIG. 8 is a block diagram of a conventional on-line information recognition.
Figure 9:
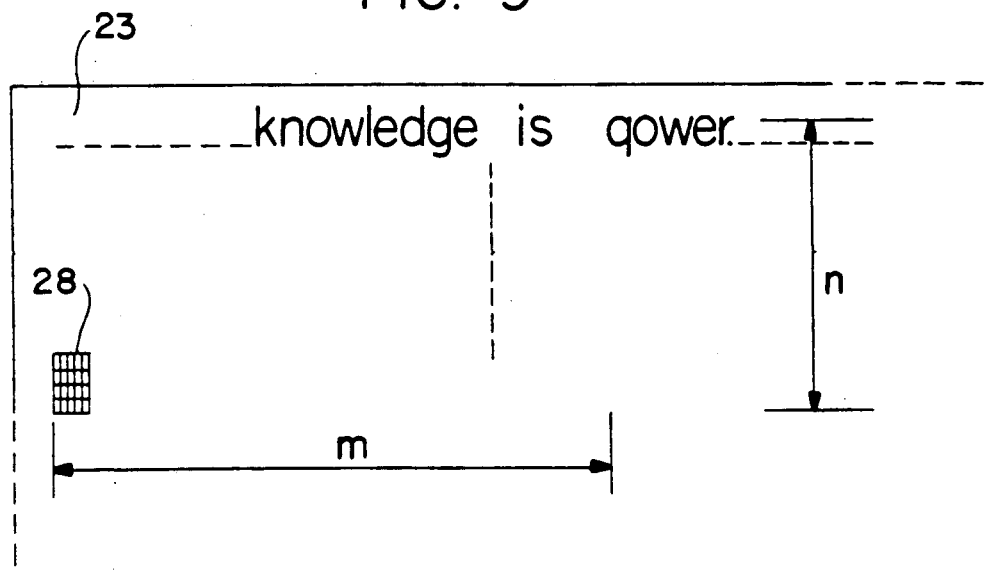
FIG. 9 illustrates an example of a candidate character string displayed on the system of FIG. 8.

Another embodiment of the information recognition system according to the present invention will be described. In this embodiment, after the character string "todag" is displayed on the tablet 1 (FIG. 2) and the cursor 7 is moved to the position of one of the candidate characters for indicating the error character (the character "g" in FIG. 3(a)), a window 10 is displayed in the vicinity of the indicated character "g" as illustrated in FIG. 6(a). In the window 10, the group 11 of candidate characters "g", "j", "y" and "v" which correspond to the correct inputted character information "y", a cursor 12 for indicating one of the candidate characters, a downward cursor icon 13, and an upward cursor icon 14 are illustrated. The downward and upward cursor icons 13 and 14 function as cursor keys. FIG. 7 illustrates another embodiment of functions displayed in the window 10.

Figure 6B:
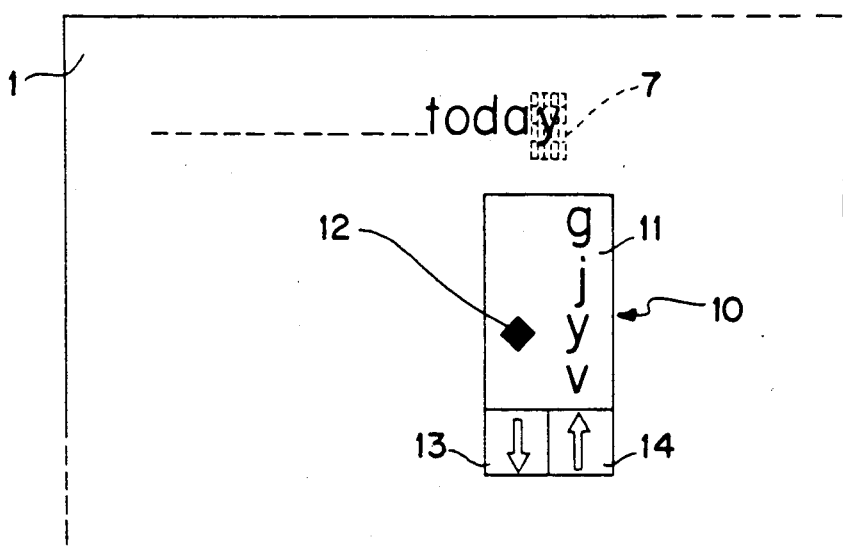

The cursor 12 moves downward and cyclically along the candidate characters by one column for indicating each character by initiating the downward cursor icon 13 with the pen 1P. Conversely, the cursor 12 moves upward for indicating each character by initiating the upward cursor icon 14. The candidate character indicated by the cursor 12 (the character "g" in FIG. 6(a)) is displayed in the candidate character string. When the operator indicates the downward cursor icon 13 two times with the pen 1P, the cursor 12 moves to the third candidate character "y", and the character "y" is displayed in the candidate character string (FIG. 6(b)).

It is alternatively, possible to construct the system so that the cursor 12 moves downward and cyclically when the operator indicates the error character to be corrected, with the pen 1P. It is also possible to construct the system so that the cursor 12 moves downward and cyclically when the operator indicates any of the error characters to be corrected and the icons 13 and 14, with the pen 1P.

In the information recognition system of this embodiment, the cursor icons 13 and 14 for moving the cursor 12 are displayed together with the group 11 of candidate characters. The correct character can be selected by indicating either of the cursor icons 13 and 14. Thereby the correction of characters can be conducted more easily.

Other icons for performing other functions may be displayed in the window 10. For example, an icon for displaying characters other than the candidate characters may be present in the window 10. When the correct character is not included in the displayed group 11 of candidate characters, other characters (letters, numerals, etc.) are sequentially displayed in the window 10 by indicating the icon with the pen 1P.

Having described on-line character recognition systems including a tablet or digitizer as an input device, it will be appreciated that the present invention can be applicable to an OCR system having an optical scanner or a voice recognition system having a microphone.

Figure 1B:
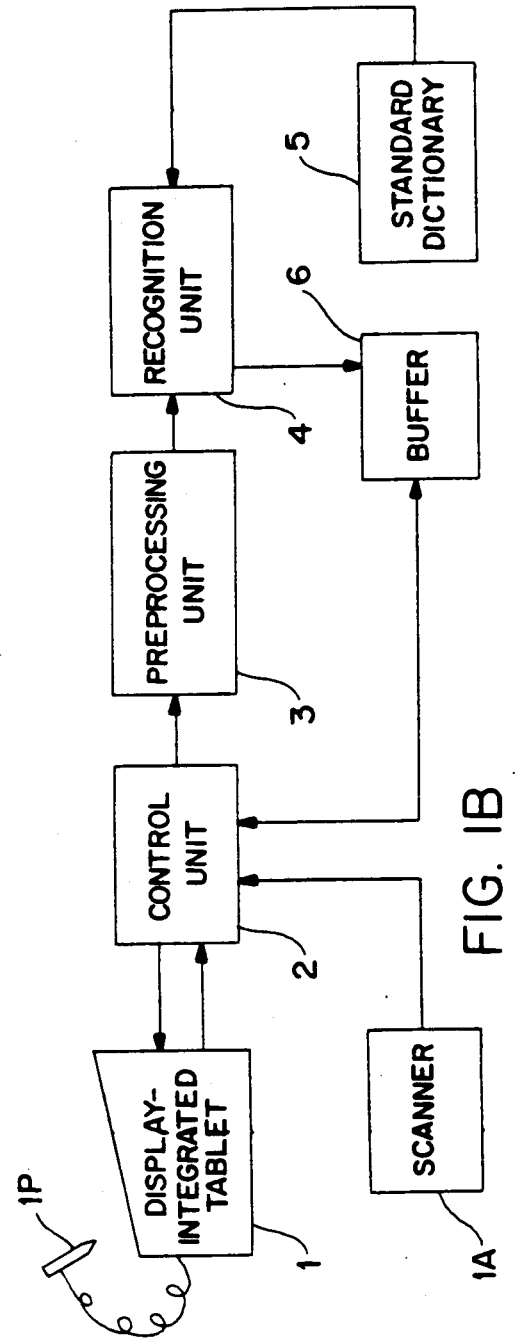
FIG. 1B is a block diagram of another on-line information recognition according to another embodiment of the present invention.

FIG. 1B illustrates another embodiment of the system according to the present invention having an optical scanner 1A provided as an input device. Image data taken by the optical scanner 1A are processed in the control unit 2 and preprocessing unit 3 for obtaining feature patterns. When the present invention is applied to a voice recognition system, a microphone is used as an input device.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An information recognition system comprising:
   input means for inputting information;
   recognition means for recognizing said information inputted at said input means as at least one group having a plurality of candidate characters;
   memory means for storing said groups of said candidate characters, said characters in each said group being arranged in a probability order having a first character of the highest probability and a last character of the lowest probability;
   display means for displaying said first characters in each said group of said candidate characters, said display means including coordinate input means for selecting one of said first characters being displayed on said display means; and
   character correcting means, responsive to an operator, for replacing said one first character selected by said coordinate input means with one of said candidate characters in said group corresponding to said one first character having the next highest probability order.

2. A system according to claim 1, wherein said display means comprises a display-integrated tablet for displaying said information and providing said input means.

3. A system according to claim 1, wherein said input means comprises an optical scanner.

4. A system according to claim 1, wherein said input means comprises comprises a microphone.

5. An information recognition system comprising:
   input means for inputting information;
   recognition means recognizing said information inputted at said input means as at least one group having a plurality of candidate characters;
   memory means for storing said groups of said candidate characters, said candidate characters in each said group being arranged in a probability order having a first character of the highest probability and a last character of the lowest probability;
   display means for displaying said first characters in each said group having a plurality of said candidate characters, said display means including coordinate input means for selecting one of said first characters being displayed on said display means;
   window display means for displaying a window having said candidate characters in vicinity of said one first character in said group to which said one first character selected by said coordinate input means belongs; and
   character correcting means, responsive to an operator, for replacing said one first character selected by said coordinate input means with one of said candidate characters in said window.

6. A system according to claim 5, further comprising icon display means for displaying on said display means at least one icon which scrolls through said candidate characters of said window in response to said coordinate input means.

7. A system according to claim 5, further comprising means for sequentially displaying said candidate characters for said window in a predetermined order on said display means.

8. A system according to claim 5, wherein said display means comprises a display-integrated tablet for displaying said information and providing said input means.

9. A system according to claim 5, wherein said input means comprises an optical scanner.

10. A system according to claim 5, wherein said input means comprises a microphone.

11. A system according to claim 1, wherein said coordinate input means comprises an input pen.

12. A system according to claim 5, wherein said coordinate input means comprises an input pen.

13. A method for processing information in an information recognition system, comprising the steps of:
   (a) inputting information to said system;
   (b) processing said information inputted at said step (a) as at least one group having a plurality of candidate characters;
   (c) storing said groups of said characters so that said candidate characters in each said group are arranged in a probability order having a first character of the highest probability and a last character of the lowest probability;
   (d) displaying said first characters for each said group;
   (e) selecting one of said first characters being displayed at said step (d); and
   (f) replacing, responsive to an operator, said one first character selected at said step (e) with one of said candidate characters in said group having the next highest probability in said probability order.

* * * * *